June 15, 1943.　　　A. R. PATO　　　2,321,934
ROTATING PUMP
Filed March 12, 1941　　　2 Sheets-Sheet 1

INVENTOR.
A. R. Pato
BY Glascock Downing & Seebold
ATTORNEYS.

June 15, 1943.  A. R. PATO  2,321,934
ROTATING PUMP
Filed March 12, 1941  2 Sheets-Sheet 2
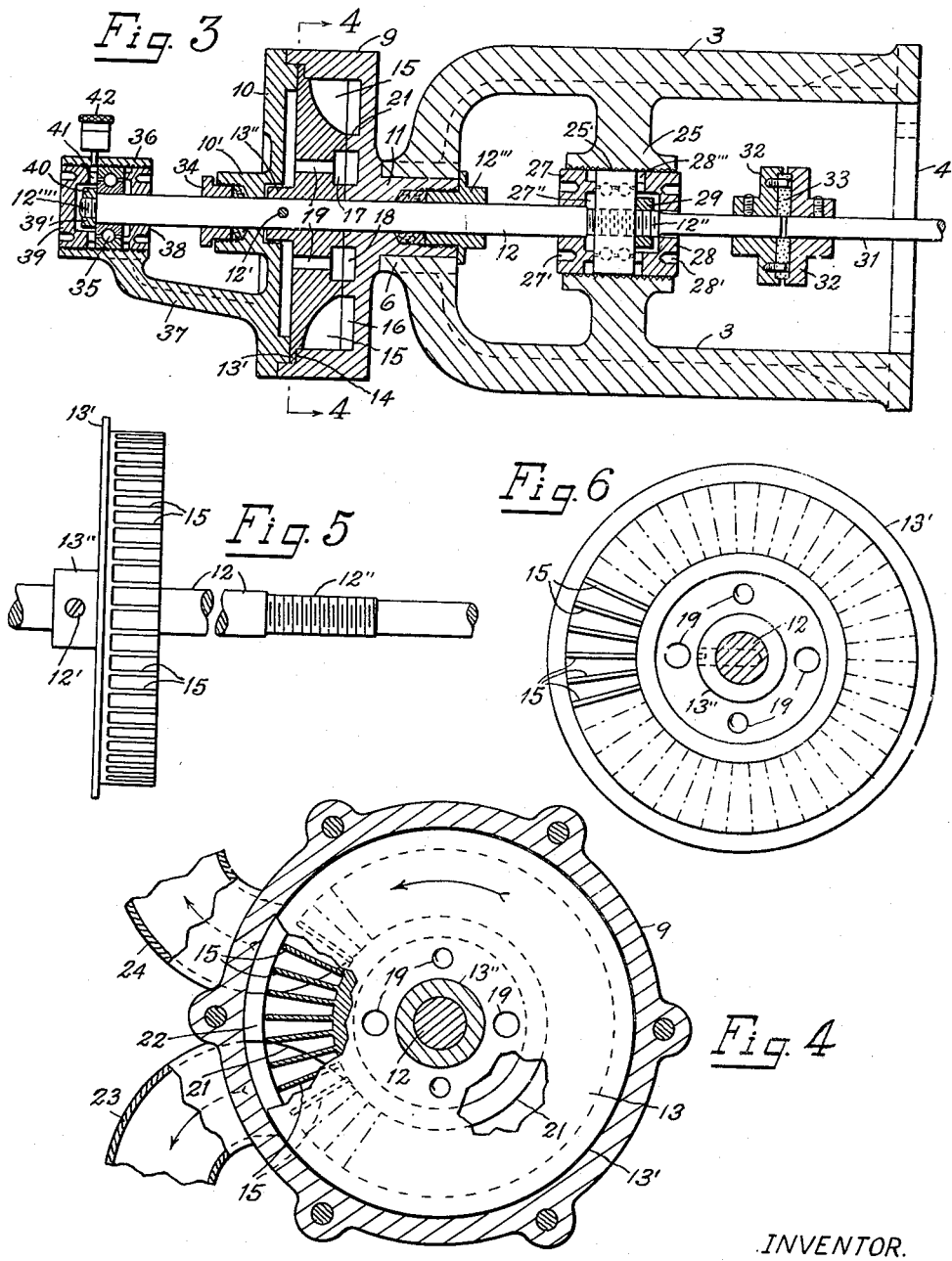
INVENTOR.
A. R. Pato
BY Glascock Downing & Seebold
ATTORNEYS.

Patented June 15, 1943

2,321,934

UNITED STATES PATENT OFFICE 2,321,934

ROTATING PUMP

Argimiro Rodriguez Pato, Habana, Cuba

Application March 12, 1941, Serial No. 382,983
In Cuba April 26, 1940

2 Claims. (Cl. 103—96)

This invention refers to rotating pumps and has for its principal object to provide a pump of this class which is completely silent in operation, due to absence of valves and gearing and also to the novel method of mounting its parts.

An additional object of the invention is to provide a pump which, in addition to the advantage of occupying little space, of being very low in cost and offering a construction that allows elevation of liquids no matter how turbid, without clogging, does not require lubrication in the pump body.

Another and highly important object of this invention is to provide a pump wherein wear between the friction surfaces existing between the rotor and the internal wall of the pump body is eliminated, due to the mechanically adjustable fit of these parts with respect to each other.

In the drawings:

Fig. 3 is a vertical longitudinal cross-section along the line 3—3 of Fig. 2;

Fig. 4 is a cross-section along the line 4—4 of Fig. 3;

Fig. 5 is a detailed side elevation of the rotor;

Fig. 6 is a front elevation of the rotor showing the interior face thereof;

Figure 1:
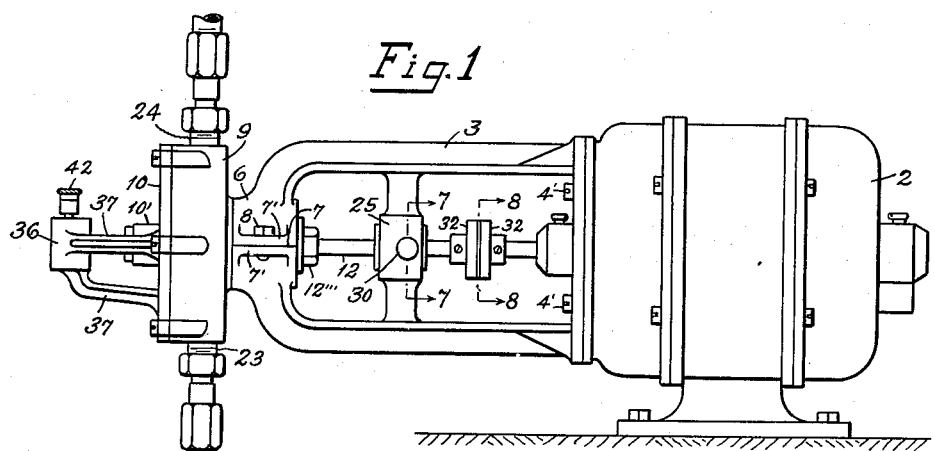
Fig. 1 is a side elevation of the pump covered by the present invention.
Figure 2:
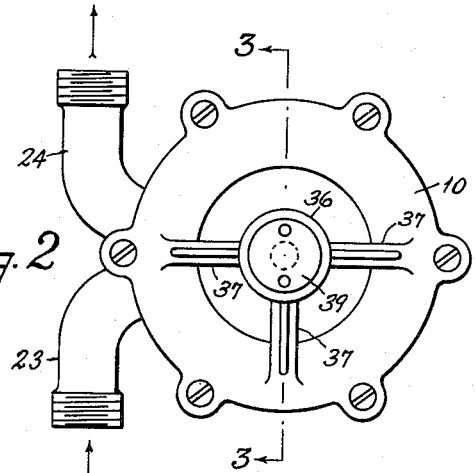
Fig. 2 is a front elevation thereof.

Number 1 designates the base of the motor 2 driving the pump. A U-shaped, raised supporting frame 3, fixed at the motor end 4 by means of bolts 4' to end shield 5 of motor 2, terminates at its front end in a neck or reduction 6 which has a lateral expansion slot 7 provided with lugs 7' drilled to receive bolt 8 the object of which will be herein-after explained.

9 designates the pump body and 10 the cover thereof. Pump body 9 is formed integrally with a bushing 11 fitting into neck or reduction 6 where it is secured by screw 8. Horizontal shaft 12 is mounted within said bushing 11, the assembly being provided with stuffing-box 12'''. Pump rotor 13 is fixed to outer end of shaft 12. This rotor, shown in detail in Figs. 5 and 6, has an undercut periphery thus exhibiting lip 13' which is conveniently lodged rotatably within the annular space forming circular recess 14 in the side of pump body 9.

The rotor face which faces the wall of the pump body exhibits an annular zone, from lips 13', which is substantially bladed, as shown in Fig. 3, and has a plane circular zone in fractional contact with the wall of the pump body, said zone having a deep annular recess 17 which coincides with another annular recess 18 in the central portion of the wall of the pump body.

From the bladed zone of rotor 13, a plurality of blades 15 issue, fixed and parallel to each other, and extending up to the sides of the pump body. Axially and exteriorly to, and integrally with said rotor extends reduction or neck 13'', which is lodged in and supported by a cup 10' in cover 10, being fixed in said support by a pin 12' to shaft 12 whereon it is mounted. In the body of the rotor are passages 19 which communicate with annular chambers formed by counterbores 17 and 18 and, in addition, with the annular chamber formed by an ample circular recess 20 in the inside face of cover 10 and the exterior face of the rotor.

The annular friction zone in the wall of the pump body between annular counterbore or groove 18 and the other peripheral recess or groove 16 in the wall constitutes a separating ring 21, as shown in Fig. 4, toward the side of the pump body, extending along the length of this side. In other words, the grooves 18 and 16 are concentrically arranged with respect to each other while the separating ring is the annular zone which lies therebetween. A lip 22, the object of which will be subsequently explained, is arranged in the groove 16 between the inlet and the outlet and is arranged in close relation to the outer edges of the blades.

Admission of liquid to the body of the pump is effected through pipe 23 and the exit or discharge thereof is through pipe 24.

The opposite end of shaft 12 is mounted through a support 25 integral with upper and lower arms of frame 3, said support having, for the purpose, a threaded opening 25' at the middle portion whereof is fitted a ball bearing 26 through which passes, adjustably, a threaded portion 12'' of shaft 12, and where are fitted two nuts 27 and 28, externally threaded, so as to thread into opening 25' and provided on their outer face with holes 27' and 28' to allow manipulation by means of an appropriate spanner wrench. Said nuts, as shown in Fig. 3, are disposed at either side of ball bearing 26, and on the inner face of nut 27 there are provided lubricating grooves 27'' and opposing nut 28, also its inner face, has a lubricating recess 28'', which is larger in order to lodge nut 29, which is threaded to the threaded portion 12'' of shaft 12, and which secures ball bearing 26 in position. It should be noted that the direction of threads of said nut 29 is opposite to the direction of rotation of the rotor.

Figure 7:
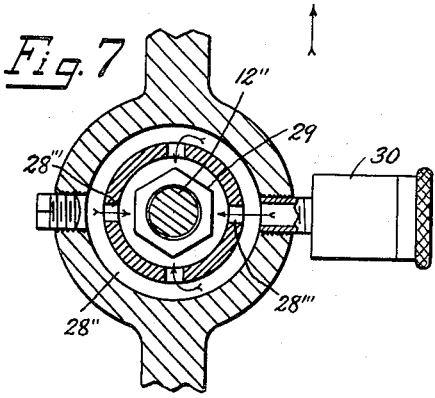
Fig. 7 is a cross-section, to an enlarged scale, and in detail, along the line 7—7 of Fig. 1.
Figure 8:
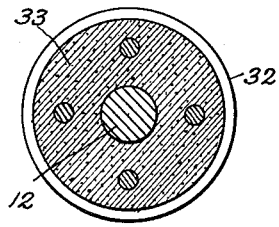
Fig. 8 is another cross-section, to an enlarged scale, in detail, along the line 8—8 of Fig. 1.

Lubrication of the said parts is effected by means of grease cup 30 and lubricant has access to shaft 12 through passages 28''', as shown in Fig. 7.

Shaft 12 is coupled to shaft 31 of motor 2 through a clutch between the discs 32, whereof, is provided packing or facing 33 made of leather or of any other material capable of deadening vibration.

For the purpose of giving shaft 12 complete stability and equilibrium during operation, the same extends through cup 10' an exterior portion whereof is hollow, and is fitted with stuffing-box 34. Shaft 12 projects beyond said stuffing-box 34 and is mounted on ball bearing 35 which is fitted to cover 36 sustained in turn by three radial arms 37 cast integrally with said cover and with cover 10, from which they project. Numbers 38 and 39 designate respectively the nut and retaining nut threaded within cover 36 and which hold shaft 12 in position in the ball bearing 35, said shaft terminating in threaded nose 12'''' where is threaded nut 40 which in turn is lodged in recess 39' of retaining or lock-nut 39 which serves as a cover to cover 36.

Numeral 41 designates lubricating ducts communicating with feeder cup 42.

Operation of this pump is explained as follows:

Movement of rotor 13 in direction shown by arrow of Fig. 4 caused by power applied from motor 2 through shaft 12 coupled to shaft 31 thereof causes liquid to flow through intake pipe 23 and fill receptacles or compartments formed between blades 15 and further causes such liquid to be transported toward and discharged through discharge pipe 24. During this work lip 22 closes compartments wherein there will be a vacuum upon the discharge of their contents into pipe 24, as shown in Fig. 4, such empty compartments effecting the suction through intake pipe 23.

As both faces of the rotor are in communication through passages 19, all circulation due to escape of liquid will accumulate in spaces 20 and 17—18, constituting a hydraulic sleeve that favors the work of the pump. In addition, the apertures of said passages 19 are used as means for inserting thereof an appropriate tool whenever it is desired to disassemble rotor 13.

In the event wear occurs on the friction surfaces between the annular zones of the wall of the pump body and the rotor which might lead to any deficiency in the work of the pump, this can be immediately corrected by adjusting the position of these parts so that they shall maintain themselves in the strictest frictional contact with respect to each other. To do this unthread nut 29 operating it through pin holes 29' and then proceed to effect necessary adjustment by means of nut 27, operating it also through pin holes 27', which shall cause sliding of shaft 12 through whatever distance may be convenient so as to obtain a-new close frictional contact between worn surfaces.

I claim:

1. In a rotating pump, a pump body including a removable cover, a revolving rotor within said pump body presenting a plurality of radial blades on a substantially curved surface, an intake and a discharge pipe for the liquid, the inner surface of said pump body facing said rotor and the corresponding rotor face each having a groove, said grooves registering with each other and providing a chamber the cover being spaced from the other face of the rotor to provide a chamber, passages in the body of the rotor connecting said chambers, an annular recess in the side of the pump body and a peripheral lip on the rotor movably lodged in said annular recess.

2. A rotating pump including a cylindrical body comprising a peripheral wall provided with an inlet and an outlet and one side wall provided with a central aperture and having concentrically arranged grooves on the surface thereof, a bushing extending from the side wall about the aperture, the other side of the body being open while the peripheral wall is further provided with an internal shoulder providing in turn a circular recess, a removable flange cover for the open side of the body, a shaft journaled in the side wall, cover and bushing, a rotor carried by the shaft and provided on its outer periphery near one side with an annular lip for rotatable movement in the recess between the shoulder and flange of the cover, and further provided on its periphery with a curved zone having radial blades, the outer portions of which are parallel to each other, the central part of the inner face of the rotor being planed for frictional contact with the wall of the body between the grooves and being provided with an annular groove for registering with the inner groove in the wall to provide an annular liquid receiving chamber, the outer concentric groove cooperating with the bladed portion of the rotor, a lip formed in the outer groove and situated between the inlet and outlet, the space defined by the inner surface of the cover and its flange constituting a liquid receiving chamber and passages through the rotor for establishing communication between the liquid receiving chambers.

ARGIMIRO RODRIGUEZ PATO.